United States Patent [19]
Abels et al.

[11] 3,884,318
[45] May 20, 1975

[54] ELECTRIC-POWERED VEHICLE WITH TIME-DELAY SWITCH CIRCUITRY, ESPECIALLY FOR ELECTRICAL VEHICLES

[75] Inventors: Theodor Abels, Breunsberg; Siegfried Puschel, Aschaffenburg, both of Germany

[73] Assignee: Linde Aktiengesellschaft, Wiesbaden, Germany

[22] Filed: Apr. 3, 1972

[21] Appl. No.: 240,475

[30] Foreign Application Priority Data
Apr. 8, 1971 Germany............................ 2117357

[52] U.S. Cl. ............. 180/65 R; 105/61; 317/141 S; 318/139; 105/61; 317/141 S
[51] Int. Cl.............................................. B60l 15/12
[58] Field of Search.......... 180/65 R, 6.28; 318/139

[56] References Cited
UNITED STATES PATENTS

| | | | |
|---|---|---|---|
| 2,571,180 | 10/1951 | Ball et al............................ | 180/6.28 |
| 3,162,772 | 12/1964 | Smith, Jr.................... | 317/141 S UX |
| 3,222,582 | 12/1965 | Heyman et al...................... | 318/139 |
| 3,335,332 | 8/1967 | Zdzieborski..................... | 317/141 S |
| 3,628,621 | 12/1971 | Lee..................................... | 180/65 R |

FOREIGN PATENTS OR APPLICATIONS

| | | | |
|---|---|---|---|
| 256,013 | 3/1963 | Australia........................... | 180/65 R |

*Primary Examiner*—David Schonberg
*Assistant Examiner*—Milton L. Smith
*Attorney, Agent, or Firm*—Karl F. Ross; Herbert Dubno

[57] ABSTRACT

A time-delay switching system for electrically driven vehicles in which successive stages of electromotive energization are switched in succession at intervals determined by the time-delay switch, which comprises an R-C time-constant network bridged across a direct-current source and a unijuction transistor whose emitter is connected between the resistor and the capacitor of this network. One base of the programmable unijuction transistor is connected to the control electrode or gate of a solid-stage controlled rectifier or thyristor whose anode is connected to the same terminal of the d-c source as the resistor. The other base of the unijuction transistor is connected to a tap of a voltage divider which, in turn, is connected across the R-C network.

8 Claims, 3 Drawing Figures

ELECTRIC-POWERED VEHICLE WITH TIME-DELAY SWITCH CIRCUITRY, ESPECIALLY FOR ELECTRICAL VEHICLES

FIELD OF THE INVENTION

Our present invention relates to an electrically-powered automotive vehicle with a time-delay switch and, more particularly, to time-delay circuitry adapted to establish a predetermined delay in load energization after triggering of the circuit. The invention also relates to electrical energization systems for electrically driven vehicles such as plant tractors, forklift trucks and the like.

BACKGROUND OF THE INVENTION

Various time-delay systems have been provided heretofore for different purposes and it is not uncommon for such systems to include a time-constant network connected to a transistor whose emitter-collector network is provided in series with a source of electric current and a load. In perhaps the simplest of such circuits, the time-constant network consists of a resistor in series with a capacitor and connected across a d-c source, the base or some other electrode of the transistor being connected to the junction of the resistor with the capacitor. The resistor and capacitor thus constitute a so-called R-C time constant network. The "load" may be another transistor, a relay or some other device operated by electrical energy.

Time-delay networks of the character described have been used heretofore in the control of electrical machinery, for example electromotive vehicles for use in areas in which internal combustion engines are undesirable or disadvantageous. Common electromotive vehicles of this type are forklift trucks, plant tractors and the like, but it should be noted that the principles disclosed herein are also applicable to electrical automobiles and the control of electrical machinery which must be accelerated and/or decelerated and in which voltage surges may cause problems if insufficiently timed to suit the speed of the machinery. In an electrical vehicle, for example, various windings may be energized in succession for acceleration, or else resistors in series with such windings may be successively shunted. If a voltage surge is applied prematurely, however, the electromotor may be damaged. Similar requirements are found in electrical machinery and it is to be noted that the discussion below of electrically-powered plant vehicles such as forklift trucks is not to be considered as limiting the scope of the disclosure unless the same is limited by the claims.

Referring again to the prior art, it should be noted that electronic time-delay switching systems have been provided heretofore for purposes such as those already described wherein a switch arrangement is provided for the pedal of a vehicle whereby a voltage proportional to the displacement of the pedal is applied to a transistor. This potential operates a time-constant network via a further transistor to produce a delay proportional to the voltage and which is applied to the drive stages of the power circuitry. When the voltage levels reach those characteristic of the respective stages, the output transistor are triggered to energize respective relays and thereby energize the loads. The relays are employed because of the low current-carrying capacity of transistors commonly in use. However, the use of electromagnetic relays involves the generation of inductive voltage peaks which may be detrimental to the transistors and hence suitable means must be provided to protect the transistor circuitry.

Furthermore, it is a common difficulty that the time-delay circuitry is affected by temperature changes, aging, wear of moving parts, etc. The complicated relay and transistor arrangement are also relatively expensive, especially when attempts are made to decrease temperature sensitivity, wear and the like or to provide the peak-voltage protection mentioned earlier.

OBJECTS OF THE INVENTION

It is an important object of the present invention to provide, in an electrically powered vehicle, an improved time-delay circuit, especially a time-delay switching circuit, whereby the aforementioned disadvantages are obviated.

Another object of the invention is to provide improved electrical circuitry for electromotor systems, especially electrically driven vehicles, which, at low cost, is able to avoid the difficulties encountered hitherto.

Still another object of the invention is to provide, in a system of the character described, time-delay circuitry for switching devices which are of reduced temperature sensitivity, lesser tendency to wear and age, and of reduced cost.

SUMMARY OF THE INVENTION

The foregoing objects and others which will become apparent hereinafter are attained, in accordance with the present invention in a time-delay switching circuit, especially for electromotive systems adapted to switch successive electrical driving circuits in an optimum time relationship so that the load is appropriately accelerated at each stage prior to the next.

The switching circuit of the present invention, which is of reduced temperature sensitivity by comparison to earlier systems and is less susceptible to wear and environmental deterioration while being of low cost, comprises a time-constant network consisting of a resistor and a capacitor in series (R-C network) connected across the direct-current source, and a unijunction transistor whose emitter is connected to the tie point between the resistor and the capacitor: the threshold-setting base of the unijunction transistor is connected to a voltage divider network establishing the peak-point value of the unijunction transistor, and its other base is connected to the control electrode or gate of the thyristor which is provided between the direct-current source and the load. A switch is inserted between the source and the R-C network and voltage divider network to initiate the switching process. As a result, the unijunction transistor is a programmable switch which can be tripped at any desired threshold and hence automatically responds to variations in the supply voltage and can be made to offset any thermal variations in the operation of the switch.

As is recognized, the unijunction transistor is a three-electrode device whose base-base network acts as a resistor which is triggered to a high conductivity state when the emitter potential reaches a level known as the peak-point voltage. The latter is established by the programmable or threshold base. The unijunction transistor has a negative temperature coefficient of conductivity and, when used with voltage divider resistors of a positive temperature coefficient, can be temperaturecompensated without complex components. The R-C network allows the time constant of the system to be changed with ease.

According to an important feature of the present invention, the input electrode of the thyristor, which may be a three-element solid-state controlled rectifier (SCR) and the resistor of the R-C network are connected to one pole of the d-c source while the capacitor and the output of the thyristor are connected to the other pole of the d-c source. The thyristor in the case of an SCR, thus will have its anode connected to the positive terminal of the d-c source and its cathode connected to the negative terminal of the source, preferably through the load to be actuated by the time-delay switch. Advantageously, the load is actuated indirectly, e.g. via a relay whose coil is interposed between the negative terminal of the d-c source and the cathode (and capacitor of the R-C network). The relay preferably is provided with contacts adapted to shunt or render effective resistors in series with the windings of an electromotor for an electrical vehicle, especially a warehouse-type vehicle such as a forklift truck. The resistor of the R-C network and the input or anode of the thristor are connected to the positive terminals of the d-c source and, preferably, lie in series with a switch operable to initiate the timing or sequence.

According to still another feature of the invention, a diode is bridged across the capacitor of the R-C network and thus opposes reverse-current surges thereacross when the unijunction transistor and, consequently, the thyristor are triggered. The time-constant capacitor is thereby protected.

Still another feature of the present invention resides in the connection of a plurality of such time-delay circuits in cascade, with the anode (input) of the thyristors of each subsequent circuit being connected to the d-c source while the time-constant network and unijunction transistor voltage divider is connected to the cathode or output electrode of the previous thyristor stage. The system can then be used to switch relays or like devices in sequence with a switching pattern adjusted to the individual needs of each stage. Consequently, if initial acceleration proceeds more slowly than subsequent acceleration of the electromotor stages, the time constant for an earlier circuit may be increased relative to the time constant of a subsequent network. Each individual stage can have the delay established by the respective R-C network, preferably by adjusting a variable resistor forming part thereof, whereby the next stage will only be triggered upon the elapse of the time period of the previous stage.

According to still another feature of the invention, the relays operated by the time-delay circuits are provided with switch contacts adapted selectively to bridge resistors in series with respective stages of a drive motor for an electric vehicle, especially a forklift truck. In these applications of the present invention, for which the cascade circuitry is particularly desirable, the motor is connected across the d-c source in series with a plurality of resistors which may be selectively shunted to increase the energization levels of the motor. Preferably, the electromotor drive comprises two motors which selectively may be energized in succession or in parallel, depending upon the requirements. In this case, the stages of the cascade time-delay circuit may first cut out the individual resistors of the motors, then switch the tandem energization circuitry of the motors to a parallel energization and finally cut out or cut in the resistors in series (or in parallel) with the parallel-connected motors. When a group of resistors is thereby cut into the circuit, the stages may also be provided means for shunting one or more of them. To this end, the subsequent stages of the cascade may operate relays whose contacts are provided in series with the time-constant networks of earlier stages of the cascade and/or the thyristor circuits thereof to switch off these earlier stages.

According to a more specific feature of the invention, the circuit is designed to operate two drive motors which, as noted above, can be selectively connected in tandem or in parallel to the electric power source. According to the invention, the motors, which may have selectively energizable windings for forward and reverse, are provided in circuit with one or more resistors across the battery or other source of direct current, the initial time-delay stages of the energization circuit operating relays designed to shunt these resistors and thereby increase the power supplied to the motor. The invention further provides for a switchover relay adapted to convert the motors from tandem or series energization to parallel energization, this switchover relay being likewise connected to a time-delay stage. Parallel to the coil of the switchover relay is provided an auxiliary relay which may open-circuit all or some of the previously actuated relays which may be bridged by respective resistors. In other words, an auxiliary relay may be provided which interrupts or closes the connection between the output terminal of the thyristor and the negative bus bar, depending upon the sense of energization. Load resistors may be provided across the or each set of auxiliary relay contacts so that the associated thyristors remain conductive when the switch of the auxiliary relay is open, especially in the case when a parallel connection of the motor is to be converted to a tandem or series connection. The resistors may then be shunted or rendered effective by the time-delay switching circuits to increase or decrease the power supply to the motors. The switching device thus guarantees the cut-in or cut-out of the original resistors in each sequence that undesirable high starting-current peaks are avoided. By an appropriate selection of the resistance of the time-constant resistors and the capacitance of the condensors of these networks, it is possible to establish delay times selectively settable between several milliseconds to the order of seconds. Even sudden depressions of the accelerator pedal to its limit will not yield high current peaks since the sequence of stages of energization of the motor will merely proceed at the optimum rates determined by the several time constants. Since the entire system operates through relays, no special means is required to de-energize the coils and prevent constant current drain. Furthermore, the entire switching arrangement is of relatively low cost and allows maximum efficient utilization of the electrical and mechanical parts. By comparison with earlier pneumatic, hydraulic or fluidic delay arrangements, the switching system of the present invention is substantially smaller, less expensive and less susceptible to breakdown.

According to another feature of the invention, the switchover delay is connected to a further time-delay circuit which, in turn, switches a further auxiliary relay adapted to operate, by shunting resistances, the motors in their parallel connection. Thus the motors in their tandem or series circuitry may be energized increasingly by shunting of appropriate resistors and in their parallel connection can be operated at greater power by similar short-circuiting of the energization resistance.

Still another feature of the invention resides in the provision of steering responsive limit switches or the like in the circuit of the switchover relay so that when the steering wheels of the vehicle reach the limit of their safe displacement at a given speed, the current to an associated thyristor will be interrupted and, for example, a reduction in the supply of power to the motors by switching from a parallel connection to a series connection is carried out. This has two advantages in that it prevents excessive speed on curves and provides for differential action of the wheels which is possible when the motors are connected in series, but is not possible when they are energized in parallel using conventional d-c motors.

DESCRIPTION OF THE DRAWING

The above and other objects, features and advantages of the present invention will become more readily apparent from the following description, reference being made to the accompanying drawing in which.

SPECIFIC DESCRIPTION a. Structure

Figure 1:
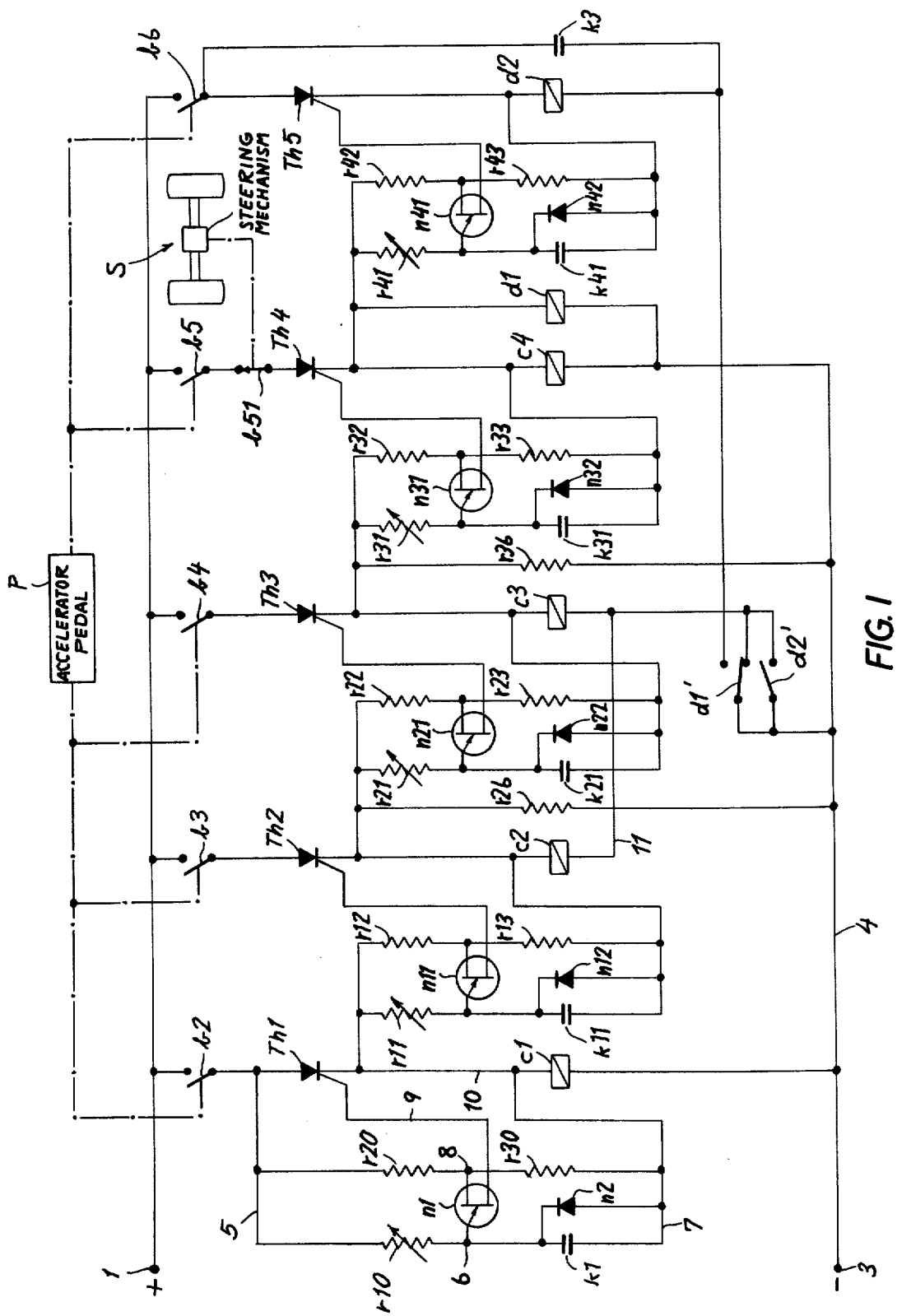
FIG. 1 is a circuit diagram of a control circuit for the acceleration of an electric vehicle, e.g. a forklift truck according to the present invention, the circuit having a plurality of time-delay circuits in tandem.

In FIG. 1 of the drawing, we have represented the positive terminal and the negative terminal of a direct-current source, e.g. the removable and rechargeable battery of a forklift truck or like electric vehicle, at one end 3 respectively. The system is provided with five time-delay circuits supplied by the bus bar 2, connected to the positive terminal 1, and a bus bar 4, connected to the negative terminal 3. The system comprises respective switches $b2 - b6$ in series between the positive terminal 1 of the source and the anode of respective thyristors $Th1 - Th5$, shown as solid-state controlled rectifiers.

The first timing stage comprises a R-C network consisting of a resistor $r10$ and a capacitor $k1$ connected via lines 5 and 7 across the anode and cathode terminals of the thyristor $Th1$ and between the switch $b2$ and the coil $c1$ of a relay to be actuated after the lapse of the predetermined delay time by the thyristor $Th1$.

At the tiepoint or junction 6 of the resistor $r10$ and the capacitor $k1$, there is connected the emitter of a unijunction transistor $n1$ whose first base, establishing the threshold or programming level is tied to the junction 8 between resistors $r20$ and $r30$ of a voltage divider network bridged across the conductors 5 and 7. The other base of the unijunction transistor is connected to the gate of the thyristor $Th1$. A protective diode $n2$ is in shunt with the capacitor $k1$ and is poled to block current flow in the capacitor-charging direction. The lead connecting the gate of thyristor $Th1$ with the second base of the unijunction transistor $n1$ is represented at 9. The cathode of the thyristor $Th1$ is in turn connected in series with the relay $c1$ (via line 10) and the negative bus bar 4.

Subsequent stages are provided to respond to the preceding stages and thus the R-C networks $r11 - k11$, $r21 - k21$, $r31 - k31$ and $r41 - k41$ are connected between the cathode of the preceding thyristor $Th1$, $Th2$, $Th3$, $Th4$ and a lower voltage point, e.g. the negative bus bar 4. Similarly, each subsequent stage has a voltage divider network $r12 - r13$, $r22 - r23$, $r32 - r33$, and $r42 - r43$ connected in parallel to the time-constant network end to which the first base of the respective unijunction transistor $n11$, $n21$, $n31$ and $n41$ is connected. The emitter of each of these unijunction transformers is connected between the resistor and capacitor of the associated time-constant network, while the other base of the unijunction transistor is tied to the gate of the associated thyristor $Th2$, $Th3$, $Th4$ and $Th5$. The protective diodes $n12$, $n22$, $n32$ and $n42$ are provided here as well across the respective capacitors $k11$, $k21$, $k31$ and $k41$. Relays $d1$ and $d2$ are operated by the last two stages and have respective contacts as shown at $d1'$ and $d2'$ respectively. The operating loads for the successive stages of the circuit are represented as the relays $c2 - c4$. A capacitor $k3$ is disposed between the switch $b6$ and the contacts $d1'$ as will be described in greater detail hereinafter.

The switches $b2 - b6$ are designed to be energized in sequence by depression of the decelerator pedal of the electric vehicle which is not otherwise illustrated.

Figure 2:
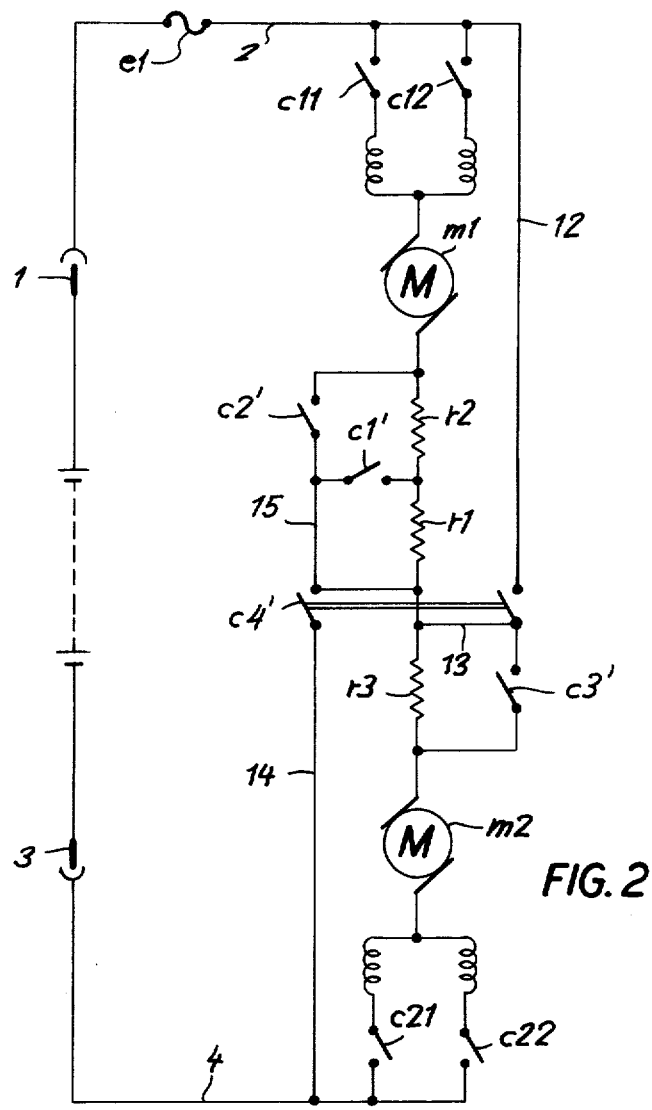
FIG. 2 is a circuit diagram of the motor networks of the system.

In FIG. 2, however, we show a fuse $e1$ connected in the power circuit having the positive busbar 2 and the negative busbar 4. The circuit comprises a pair of drive motors $m1$ and $m2$ in series with a pair of winding each and respective parallel switches $c11$ and $c12$ or $c21$ and $c22$ respectively. The contacts $c1'$, $c2'$ and $c4'$ are, of course, energized by the respective relay coils $c1 - c4$ and are intended to shunt resistors $r1$, $r2$ and $r3$ in series with the motors $m1$ and $m2$ respectively. The switch contact $c4$ enables the motors $m1$ and $m2$ to be connected in parallel. The leads running to these contacts have been represented at $12 - 15$.

Figure 3:
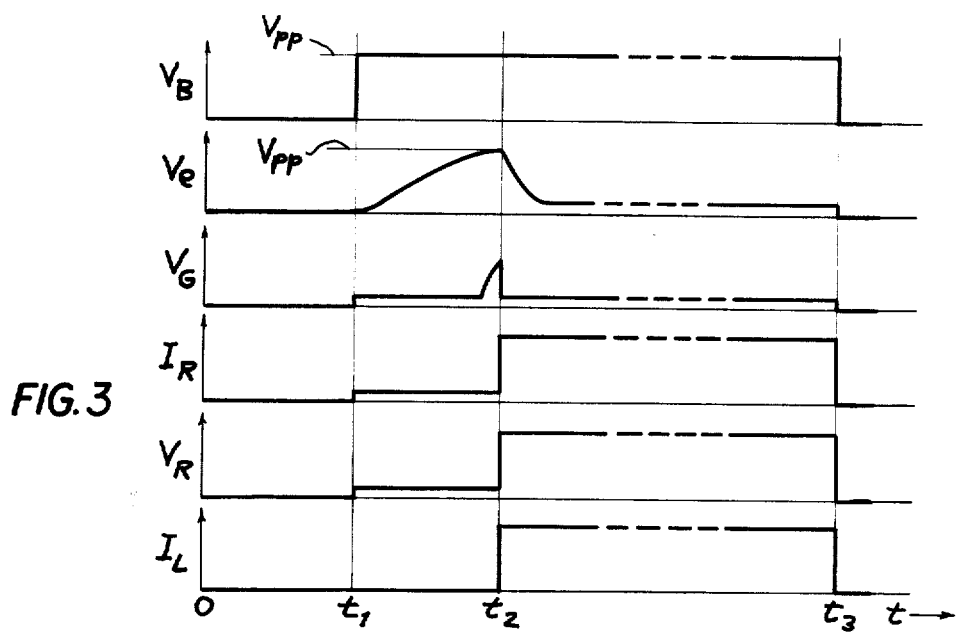
FIG. 3 is a voltage and current timing diagram illustrative of the operation of the circuit of FIG. 1.

Prior to discussing the overall operation of the system, the time-delay switching characteristics of any of the circuits should be appreciated. Thus, with switch $b2$ open in the circuit of FIG. 1, there is no voltage applied across the voltage divider $r10 - k1$ or across the voltage divider $r20 - r30$ and no potential applied across the thyristor $Th1$ or the relay coil $c1$. When switch $b2$ is closed at time point $t1$, however, the peak-point voltage $V_{pp}$ appears at the junction point 8 as the base voltage $V_b$. The capacitor $k_1$ charges to the peak-point voltage as represented at $V_e$ in FIG. 3 at a rate determined by the product of the resistance and capacitance of the resistor $r10$ and capacitor $k1$, respectively. At the preset moment $t_2$, the capacitor voltage reaches the peak-point voltage and hence the emitter potential $V_e$ of unijunction transmitter $n1$ is sufficient to trigger the latter into a conductive stage. The triggering pulse is applied to the gate of the thyristor $Th1$ as represented at $V_g$. The current $I_r$ traverses the relay coil $c1$ to which the potential $V_r$ is applied, thereby closing the relay contacts and allowing the load current $I_L$ to develop in the motor.

b. Operation

When the accelerator pedal represented at P for purposes of illustration only, is depressed to close switch $b2$, the current flows from busbar 2 via the switch $2b$ to the conductor 5 and thence through the resistor r10 to charge the capacity k1 with a time constant determined by the product of the resistance and capacitance. Upon the lapse of this present time, the voltage at junction 6 reaches an emitter potential of the unijunction transistor 1 assuming the appropriate potential at the base tied to junction 8, which renders the unijunction transistor conductive. The capacitor k1 is returned via conductor 7 to the junction between the coil of relay c1 and the cathode of the thyristor Th1. At this point, it should be noted that line 7 can be connected directly to conductor 4, if desired, i.e. to the other side of the relay c1.

The voltage divider r20 – r30 simultaneously establishes the potential 8, i.e. the peak-point voltage. As soon as the capacitor potential across condenser k1 reaches this peak-point potential at junction 6, the unijunction transistor n1 becomes conductive. A closed circuit is then provided from capacitor k1 via the junction 6 through the emitter/second-base network of transistor n1, conductor 9, the gate of thyristor Th1, conductor 10 and line 7 to return to the other side of the condenser k1. This discharge current represented as a voltage pulse in FIG. 3 at $V_G$, triggers thyristor Th1 and closes a load circuit between busbar 2 and busbar 4 through the switch b2, the anode/cathode network of thyristor Th1, line 10 and the coil c1 of the relay.

As can be seen from FIG. 2, the relay c1 is actuated to close the contacts c1' bridged across the power resistor r1 and energize the motors of the vehicle. When the accelerator pedal is depressed beyond its position associated with the acceleration designed by closure of switch b2, however, the further energization of the motor corresponding to this additional displacement of the brake pedal cannot, be affected until elapse of the interval determined by the resistor r10 and the capacitor k1. By appropriate selection of the resistance of resistor r10 and the capacitance of condenser k1, this delay can be of the order of several hundred milliseconds, i.e. a period, enabling the vehicle to accelerate sufficiently to accommodate the resulting surge of electric current. On the other hand, this period is to small that it is hardly noticeable to the driver and, in fact, does not affect the operation if the pedal is depressed sufficiently slowly. In this case, the next switch will only be closed well after its time constant network has been "enabled" by the previous time constant network. To protect the capacitor k1, it has been found to be desirable to connect the diode n2 thereacross.

It should be noted that other switching systems may be used in accordance with the principles set forth above. For example, the output of transistor n1 may be connected by a resistor to the gate of the thyristor Th1. Between the output of unijunction transistor n1 and this additional resistor, a further conductor is joined which may run to still another resistor connected to the busbar 4. The circuit illustrated in the drawing, however, has been found to have more stable characteristics. It has been found advantageous to use this latter circuitry when conductor 7 is to be tied directly to the busbar 4.

The same sequence is followed with each of the time-constant circuits associated with switch b3 – b6 which may be closed in order by depression of the accelerator bed P. However, since each time-constant network r11 – k11, r21 – k21, r31 – k31 and r41 – k41 and the associated voltage divider r12 – r13, r22 – r23, r32 – r33 and r42 – r43 are connected to the output of the preceding thyristor Th1, Th2, Th3 and Th4, they are only operative when they are enabled by conduction of the preceding thyristor. Thus, switch b2 must have rendered thyristor Th1 effective and the first time period must have elapsed before closure of switch b3 can render the next time-constant circuit effective. Relay c2 then is energized to cause contacts c2' to short-circuit resistor r2 and increase the voltage applied to the motor. The same holds for switch b4 whose capacitor k21 is charged through resistor r21 and whose voltage divider r21, r23 is energized when both thyristor Th2 and switch before are rendered conductive. At the lapse of the time constant for this third stage, relay c3 is energized to close contacts c3' and short-circuit resistor r3.

Similarly, closure of switch b5 and the lapse of the previous delay periods applies electric current to the R-C network r31 – k31 and the voltage divider r32 – r33 to operate the unijunction transistor n31 and trigger thyristor Th4. When coil c4 becomes conductive, the contacts c4' are closed to switch the series motor circuit to a parallel motor circuit.

More specifically, relay c4 and its contact c4' connect line 12 (FIG. 2) line 13 and resistor r3 with the motor m2 to the busbar 4. Simultaneously, the contacts c4' connect line 4 through the conductors 14 and 15, the closed contact of relay c1 and the resistor r2 to the motor m1 and thence to the busbar 2. Since the coil of relay d1 is connected in parallel to the coil of relay c4, this auxiliary relay d1 is energized to trip contacts d1' and open-circuit the relays c2 and c3, thereby rendering resistors r2 and r3 effective once again. Through the second connection via the next time-constant network of relay d2, the latter is able to operate contacts d2 and energize relays c2 and c3 to again shunt resistors r2 and r3. In this circumstance, motors m1 and m2 are energized in parallel with ful voltage and all of the series resistors are short-circuited. The thyristor Th2 remains conductive in spite of operation of contacts d1' because of the presence of a hold resistor r26, while the hold resistor r36 maintains thyristor Th3 in a conductive state. These resistors are also of advantage in the operation of switch b51.

The switch b51 is connected to the steering mechanism S of the vehicle and opens when the coils have been turned through a predetermined angle, e.g. say 40° from their normal position. An excessive displacement of the wheels open-circuits switch b51 to break the current supply to relay c4 and relay d1. Switch c4' disconnects the parallel circuit and reconnects a series circuit of the motors while relay c2 and c3 rendered effective. As a result, excessive speeds are prevented during passage of the vehicle along curves and the series connection of the motor can provide a differential action to enable the inner wheels and the outer wheels to move at different speeds corresponding to the direction of the curve. When the steering displacement is reduced beyond the limiting angle, switch b51 is again closed and the thyristor Th4 is again triggered with the appropriate delay so that relay c4 is energized anew.

The improvement described and illustrated is believed to admit of many modifications within the ability of persons skilled in the art, all such modifications being considered within the spirit and scope of the invention except as limited by the appended claims.

We claim:

1. A vehicle comprising driven wheels, a direct-current source, an electric motor connected to said source and operating said wheels, a plurality of sequentially operable current-control devices for said motor energizable to establish respective states of operation of said motor, and a time-delay switching circuit interposed between said direct-current source and said motor, said circuit including a plurality of stages for the sequential control of said current-control devices each stage comprising:
- a thyristor having its main electrodes connected in circuit with a respective one of said current-control devices across said source;
- an R-C network having a series-connected resistor and capacitor connectable to said source for charging of said capacitor through said resistor from said source, each R-C network except that of the first stage being connected between the output side of the thyristor of its stage and the output side of the thyristor of the next stage;
- a voltage-divider network connected to said source, each voltage-divider network except for that of the first stage being connected between the output side of the thyristor of its stage and the output side of the thyristor of the next stage; and
- a unijunction transistor having its emitter connected to said R-C network between the resistor and capacitor thereof, a first base connected to said voltage-divider network for establishing the threshold voltage of said unijunction transistor, and a second base connected to the gate of said thyristor said networks of said first stage each having one terminal connected to the output side of the thyristor of the respective stage and another terminal connected to the input side of the latter thyristor, said voltage-divider networks each consisting of two resistors between which the said first base of the respective unijunction transistor is connected.

2. The vehicle defined in claim 1 wherein said motor-control means comprises a plurality of speed-controlling resistors in circuit with said motor and said source, at least some of said current-control devices comprising respective relays having contacts connected to shunt respective speed-controlling resistors upon conduction of the respective thyristors.

3. The vehicle defined in claim 2 wherein two electromotors connected to said wheels are provided, said motor-control means comprising switchover means connected between said source and said motors are selectively interconnecting them in series and in parallel, said switchover means including a relay forming one of said current-control devices.

4. The vehicle defined in claim 3 wherein another of said current-control devices includes a relay having contacts connected between said source and the relay whose contacts are capable of shunting said speed-controlling resistors for rendering said resistors effective to control said motors upon switchover thereof from a series to a parallel connection.

5. The vehicle defined in claim 4 wherein said current-control devices further includes safety switch means in circuit with one of said stages for actuating said switchover means to reconnect said motors from a parallel arrangement to a series arrangement.

6. The vehicle defined in claim 5 further comprising steering wheels, said safety switch means being operatively connected to said steering wheels and being effective upon excessive angular displacement thereof.

7. The vehicle defined in claim 1 wherein said current-control devices further includes a diode connected across each of said capacitors.

8. The vehicle defined in claim 1 wherein each of said stages is in series with a mechanical switch and said source, said switches being arranged for sequential actuation upon depression of a vehicle pedal.

* * * * *